(12) United States Patent
Rankin

(10) Patent No.: US 6,961,594 B2
(45) Date of Patent: Nov. 1, 2005

(54) MOBILE DEVICE POWER SAVING

(75) Inventor: Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 381 days.

(21) Appl. No.: 10/323,227

(22) Filed: Dec. 18, 2002

(65) Prior Publication Data

US 2003/0119530 A1 Jun. 26, 2003

(30) Foreign Application Priority Data

Dec. 22, 2001 (GB) .............................................. 0130801

(51) Int. Cl.$^7$ ................................................ H04B 1/38
(52) U.S. Cl. ........................ 455/574; 455/572; 370/311
(58) Field of Search ................................ 455/572, 574, 455/343.2, 456.1, 456.3, 456.4, 421, 422.1, 550.1; 370/311; 340/7.32, 825.49, 539.3, 669.3

(56) References Cited

U.S. PATENT DOCUMENTS

| | | | |
|---|---|---|---|
| 5,794,146 A | | 8/1998 | Sevcik et al. ................ 455/434 |
| 5,799,256 A | * | 8/1998 | Pombo et al. ............... 455/574 |
| 6,011,973 A | | 1/2000 | Valentine et al. ............ 455/456 |
| 6,067,460 A | * | 5/2000 | Alanara et al. .............. 455/574 |
| 6,078,826 A | | 6/2000 | Croft et al. .................. 455/574 |
| 6,233,448 B1 | * | 5/2001 | Alperovich et al. ......... 455/417 |
| 6,385,469 B1 | * | 5/2002 | Alperovich et al. ......... 455/574 |
| 6,483,815 B1 | * | 11/2002 | Laurent et al. .............. 370/318 |
| 6,584,331 B2 | * | 6/2003 | Ranta ........................... 455/574 |
| 2004/0204184 A1 | * | 10/2004 | Lin .............................. 455/574 |

FOREIGN PATENT DOCUMENTS

| | | | |
|---|---|---|---|
| EP | 0752793 A2 | 8/1997 | ............ H04Q/7/32 |
| EP | 1024628 A1 | 1/1999 | ........... H04L/29/02 |
| WO | WO9529410 | 11/1995 | ............. G01S/1/04 |
| WO | WO0069186 | 11/2000 | ............ H04Q/7/20 |

OTHER PUBLICATIONS

By Christian Rohl et al. Entitled: A Short Look on Power Saving Mechanisms in the Wirless LAN Standard Draft IEEE 802.11. Winlab Workshop on $3^{rd}$ Generation Wireless Information Networks, Piscataway, NJ, 1997, Technical University Berlin, Telecommunication Networks Group, pp. 183–188.

* cited by examiner

Primary Examiner—Sonny Trinh
(74) Attorney, Agent, or Firm—Peter Zawilski

(57) ABSTRACT

A method of power saving in a mobile device (10) for use in conjunction with a plurality of beacon devices (12, 14, 20), together with a mobile device operable or configured to effect such method. The mobile device detects and receives data from such beacon devices including a first one of said beacon devices when said mobile device is at a first location within a first predetermined range from said first one of said beacon devices. The current location of the mobile device is determined and compared with stored location data for at least some of said plurality of beacon devices, and the communications means are disabled from detecting such beacon devices when it is determined that the current location for the mobile device is outside said first predetermined range from a beacon device for which location data is held.

10 Claims, 1 Drawing Sheet

MOBILE DEVICE POWER SAVING

Figure 1:
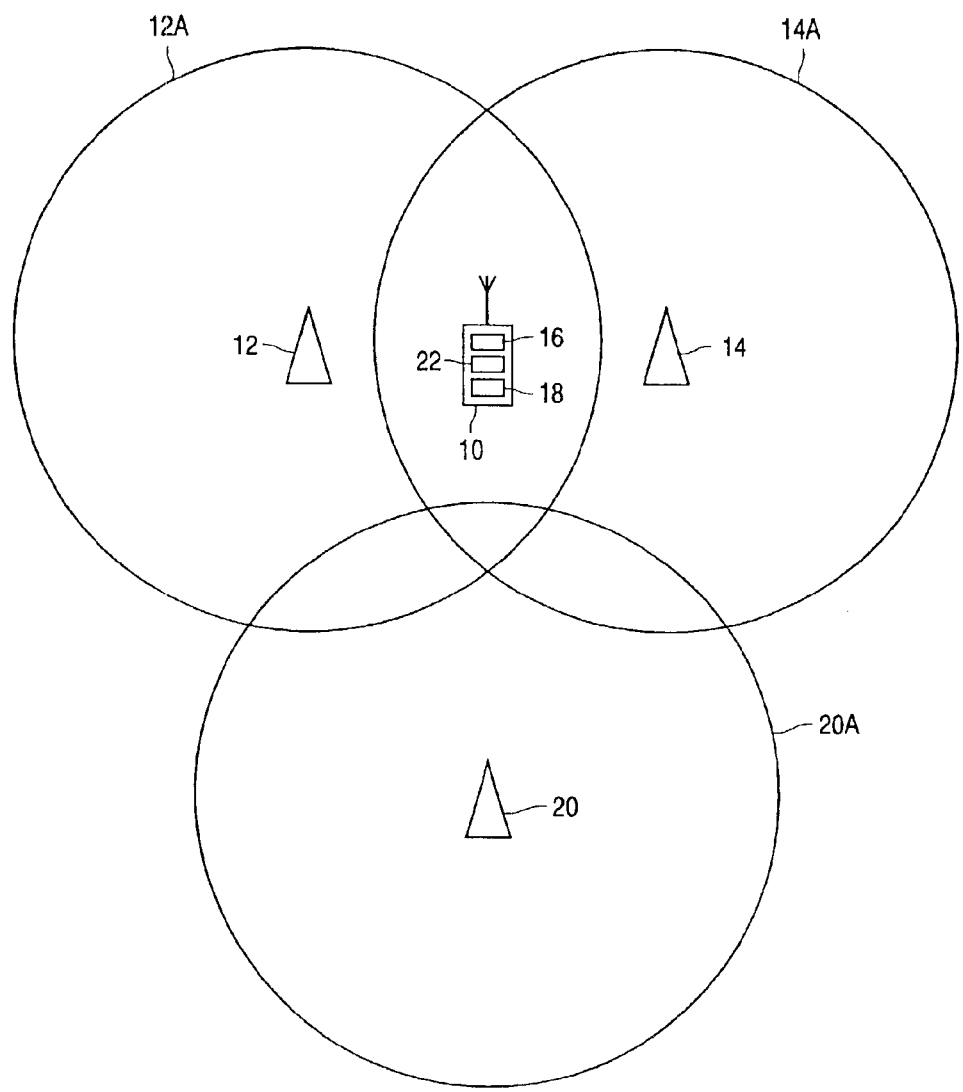

The present invention relates to methods for power saving in portable or mobile communications apparatuses, in particular those configured and operable to receive data transmitted from fixed transmitters having a geographically restricted broadcast range (hereinafter generically referred to as beacons). The invention further relates to such apparatuses constructed or controlled to effect such methods.

Enhancing the functionality of portable devices such as mobile telephones and personal digital assistants (PDA's) is increasingly a goal of the consumer electronics industry, with such devices being regularly carried and utilised by their owners. One example of this is the addition of (generally wireless) communications facilities that allow such devices to communicate with sources of additional data that the user may wish to have access to. In the case of portable telephones, already able to access data via telecommunications networks, such added communications facilities may take the form of a relatively short range wireless capability enabling the device to gather additional data from local beacons making available local data, such as special offers in local retail outlets, details of local events, and so forth. Such short (or longer) range capability is also being added to devices without an existing communications facility, such as PDA's. Examples of such enabled devices, and data delivery infrastructures supporting a variety of services, are given in the present assignees pending applications PCT EP01/06946 and EP01/13015 which are unpublished at the priority date of the present application.

Suitable protocols for data transmission over such additional communications links are readily available, with Bluetooth (Bluetooth is a registered trademark of Ericsson), 802.11 (in conventional and short range implementations), RFLite, and 802.15 being known RF (radio frequency) implementations, and IrDA being an example of a suitable short range link via infra red.

The mechanisms for establishing connection between a mobile device and a beacon will generally vary according to the protocol being followed: for example, a mechanism may involve an exchange of messages between mobile device and beacon to establish a full connection, or the mobile device may simply pick up data/messages that are being broadcast (with no access controls) from a beacon to all mobile devices within the broadcast range of that beacon.

A problem that arises is that the mobile device is generally battery powered, and that battery power will be seriously reduced if the mobile device is required to continuously monitor the RF or IR (or other wireless connection means) environment to detect the presence of a beacon delivering data that the user of the mobile device may wish to have access to.

It is therefore an object of the present invention to provide a means whereby power loss from monitoring for beacons is diminished.

In accordance with a first aspect of the present invention, there is provided a mobile device for use in conjunction with a plurality of beacon devices, said mobile device including:

communications means operable to detect and receive data from such beacon devices including a first one of said beacon devices when said mobile device is at a first location within a first predetermined range from said first one of said beacon devices;

position determining means operable to determine a current location for said mobile device; and storage means holding location data for at least some of said plurality of beacon devices;

wherein, said communications means are disabled from detecting such beacon devices when said position determining means determines the current location for the mobile device to be outside said first predetermined range from a beacon device for which location data is held.

By referring to the stored data on beacon locations, the power loss associated with scanning for beacon signals can be greatly minimised by scanning only when a positive result is expected.

The mobile device may further comprise means for comparing information identifying data accessible from a beacon when within range with a stored user profile, with said communications means continuing to be disabled if the identifying information and stored profile do not match. In this way, the scanning is made even more selective as it will only be enabled when the mobile device believes itself to be within range of a beacon supplying data known to be of interest to the user.

Also in accordance with the present invention there is provided a method of power saving in a mobile device for use in conjunction with a plurality of beacon devices, wherein:

said mobile device detects and receives data from such beacon devices including a first one of said beacon devices when said mobile device is at a first location within a first predetermined range from said first one of said beacon devices;

wherein the current location of the mobile device is determined and compared with stored location data for at least some of said plurality of beacon devices; and wherein, said communications means are disabled from detecting such beacon devices when said position determining means determines the current location for the mobile device to be outside said first predetermined range from a beacon device for which location data is held.

Further features and advantages of the present invention will become apparent from reading of the following description of preferred embodiments, given by way of example only, and with reference to the accompanying FIGURE which shows a mobile device receiving signals from two beacons.

The FIGURE illustrates a method for power saving in a mobile device 10 for use in conjunction with an array of beacon devices 12, 14, 20, the mobile device including a communications stage 16 operable to at least receive messages broadcast from a beacon 12, 14, with such communications suitably complying with a known communications protocol such as Bluetooth or 802.11. As shown, the mobile device 10 is in a position to receive data messages from beacons 12 and 14, but outside the broadcast range (illustrated at 20A) of beacon 20, so that scanning for beacon messages from that beacon will produce a negative result.

The mobile device further comprises a location detector stage 18 which may take a number of forms, and which is coupled with a store 22 of location data identifying locations (and optionally ancillary data) for the beacons 12, 14, 20. Coarse positioning techniques, such as broadcast cell identity or network triangulation (for example E-OTD), or fine techniques such as GPS, either on the mobile device or via a network operator, can be used to give absolute positioning data. GPRS, for example, offers a continuously-connected mode and also a coarse location fix. This can be used by the mobile device in conjunction with a downloaded "map" of the beacons (which map may be downloaded on entering a new network cell) to only scan for beacon messages when near the known location for the beacon, to within a predetermined range of positional accuracy, and otherwise to remain in a power conserving stand-by mode.

An extension to the system is provided where classes of services offered by beacons on the map can also be downloaded to the handset and compared against those classes currently of interest in a stored profiled for the user, with the mobile device again electing not to scan for beacon signals when it is far from beacons that would be able to supply such data.

From reading the present disclosure, other modifications will be apparent to persons skilled in the art. Such modifications may involve other features which are already known in the design, manufacture and use of communications systems and/or data network access apparatus and devices and component parts thereof and which may be used instead of or in addition to features already described herein.

What is claimed is:

1. A mobile device for use in conjunction with a plurality of beacon devices, said mobile device including:
    communications means operable to detect and receive data from such beacon devices including a first one of said beacon devices when said mobile device is at a first location within a first predetermined range from said first one of said beacon devices;
    position determining means operable to determine a current location for said mobile device; and
    storage means holding location data for at least some of said plurality of beacon devices;
    wherein, said communications means are disabled from detecting such beacon devices when said position determining means determines the current location for the mobile device to be outside said first predetermined range from a beacon device for which location data is held and to scan for data from a beacon device when the current location is determined to be inside the first predetermined range from that beacon device.

2. A mobile device as claimed in claim 1, further comprising means for comparing information identifying data accessible from a beacon when within range with a stored user profile, with said communications means continuing to be disabled if the identifying information and stored profile do not match.

3. A mobile device as claimed in claim 1, wherein said position determining means comprises a GPS receiver.

4. A communications system comprising a mobile device as claimed in claim 1, and a plurality of said beacon devices.

5. A method of power saving in a mobile device for use in conjunction with a plurality of beacon devices, comprising:
    said mobile device detecting and receiving data from a first one of said beacon devices when said mobile device is at a first location within a first predetermined range from said first one of said beacon devices;
    determining a current location of the mobile device and comparing with stored location data for at least some of said plurality of beacon devices; and
    disabling said communications means from detecting such beacon devices when said position determining means determines the current location for the mobile device to be outside said first predetermined range from a beacon device for which location data is held, and scanning data from a beacon device when the current location is determined to be inside the first predetermined range from that beacon device.

6. The mobile device for, use in conjunction with a plurality of beacon devices of claim 1, wherein the location data comprises a map of at least some of the plurality of beacons.

7. The mobile device for use in conjunction with a plurality of beacon devices of claim 1, wherein the storage means further holds class of service data for each of at least some of the plurality of beacons.

8. The method of power saving in a mobile device for use in conjunction with a plurality of beacon devices of claim 5, further comprising:
    downloading a map of the plurality of beacon devices.

9. The method of power saving in a mobile device for use in conjunction with a plurality of beacon devices of claim 8, wherein the map comprises data related to the location of the plurality of beacon devices.

10. The method of power saving in a mobile device for use in conjunction with a plurality of beacon devices of claim 5, further comprising:
    downloading data related to a class of service offered by at least one of the plurality of beacon devices.

* * * * *